United States Patent [19]

Mansfield

[11] Patent Number: 5,127,162
[45] Date of Patent: Jul. 7, 1992

[54] GAME CUTTING TOOL

[76] Inventor: Alan B. Mansfield, Rte. 1, Box 310, Bedford, Va. 24523

[21] Appl. No.: 745,167

[22] Filed: Aug. 15, 1991

[51] Int. Cl.⁵ .......................... B26B 29/00; B26B 3/00
[52] U.S. Cl. .......................................... 30/294; 30/280
[58] Field of Search ...................... 30/27, 80, 83, 278, 30/280, 294, 314, 343, 344

[56] References Cited

U.S. PATENT DOCUMENTS

| | | | |
|---|---|---|---|
| 277,932 | 5/1883 | Richards | 30/343 |
| 3,445,931 | 5/1969 | Knudson | 30/294 |
| 3,613,241 | 10/1971 | Allen | 30/294 |
| 3,673,687 | 7/1972 | Phillips et al. | 30/294 |
| 4,001,934 | 1/1977 | Bell | 30/294 |
| 4,062,117 | 12/1977 | Coleman | 30/294 |

*Primary Examiner*—Douglas D. Watts
*Assistant Examiner*—Paul M. Heyrana
*Attorney, Agent, or Firm*—Leon Gilden

[57] ABSTRACT

A hand-held cutting tool includes a unitary housing defining a through-extending housing opening for manual grasping of the housing, with a piercing boss plate mounted below a bottom wall of the housing to effect a piercing of an associated animal game carcass, with a cutting blade positioned at an obtuse angle between a cutting blade edge and the piercing boss plate to bend a forwardmost end portion of a cutting slot defined between the piercing boss plate and the housing bottom wall. A modification of the invention includes a blade receiving slot projecting through a rear wall of the housing and the cutting slot to permit reciprocation of the knife blade to effect a severing or sawing action of the game carcass as required.

1 Claim, 3 Drawing Sheets

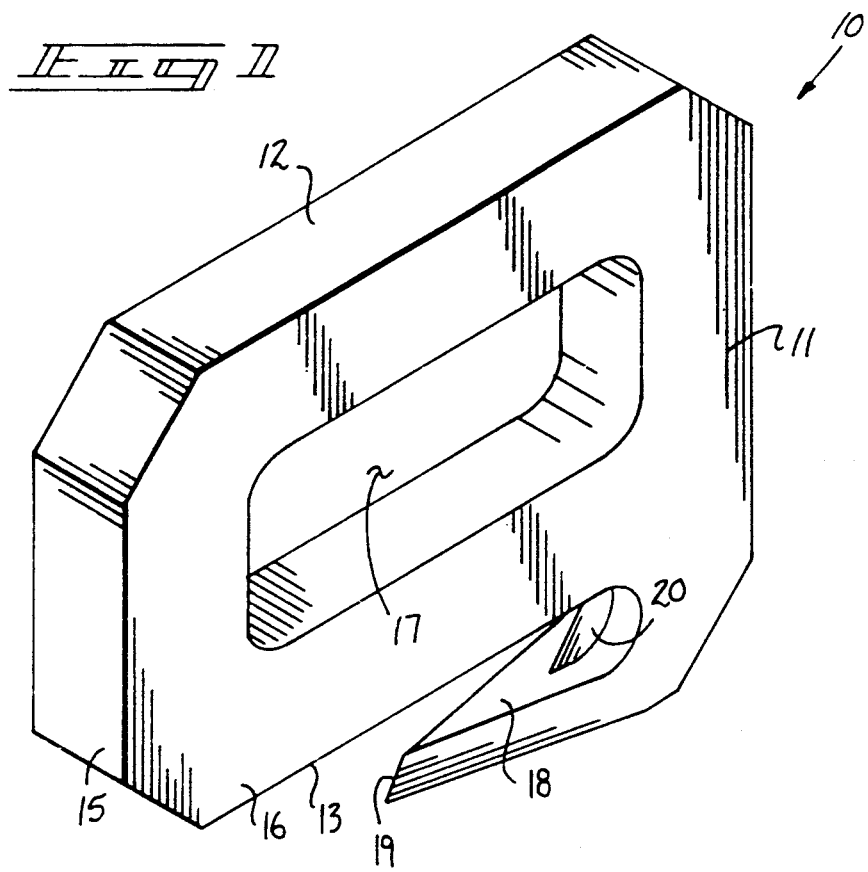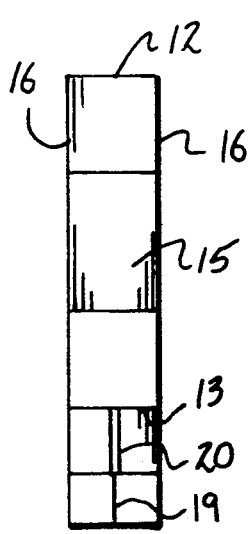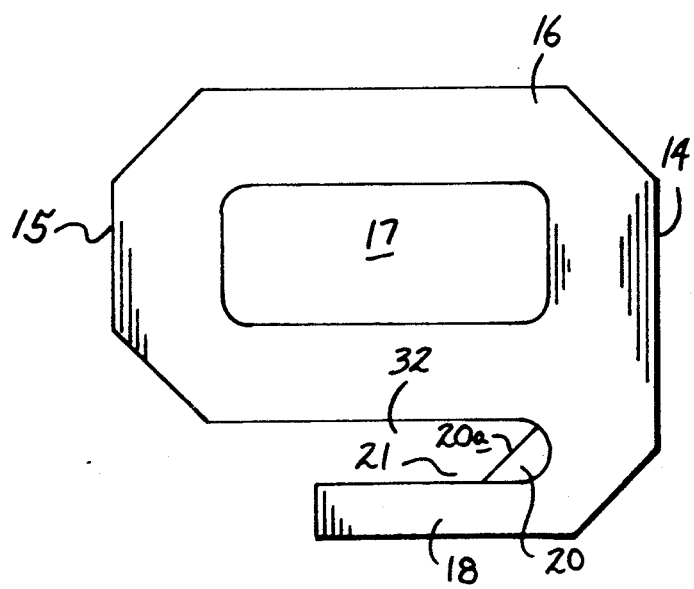

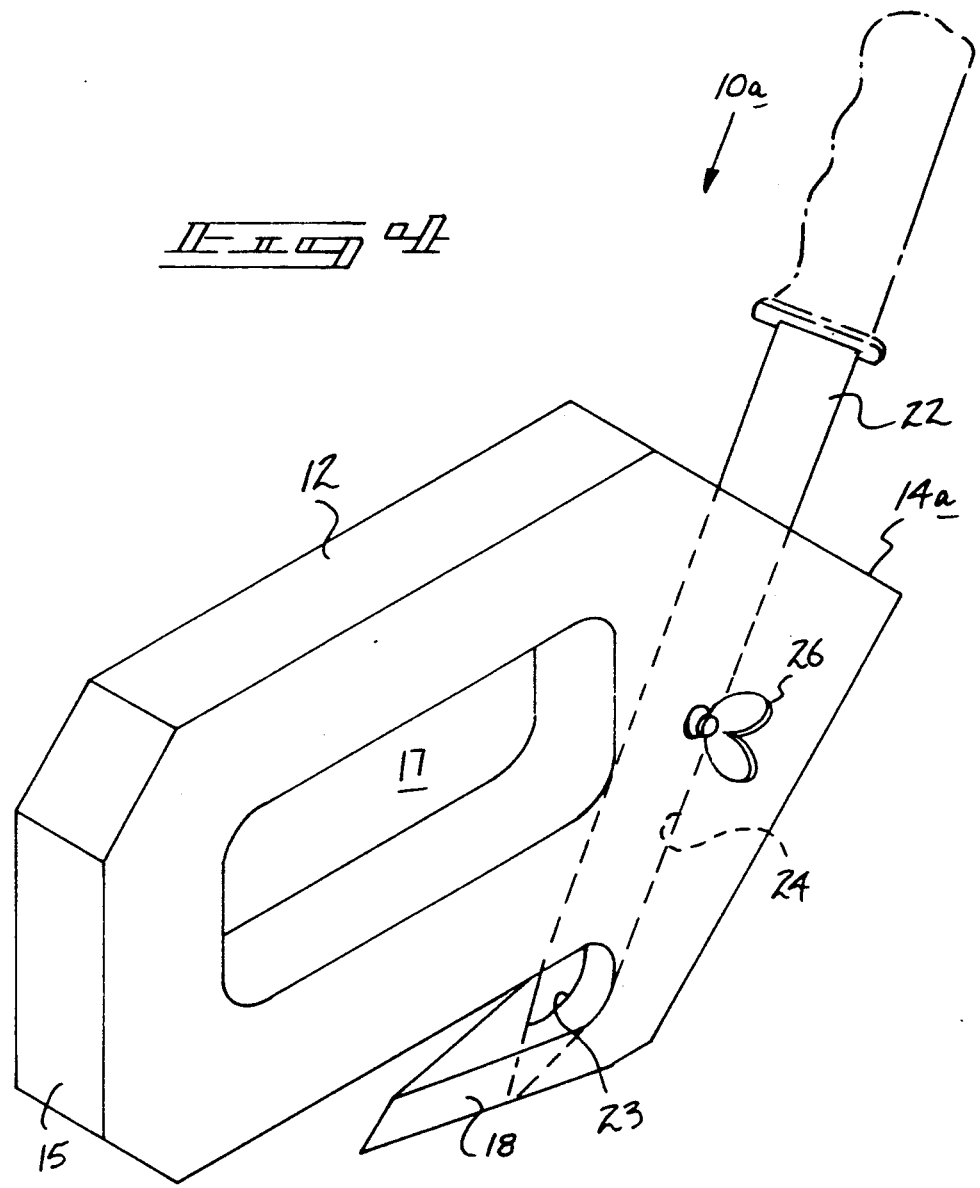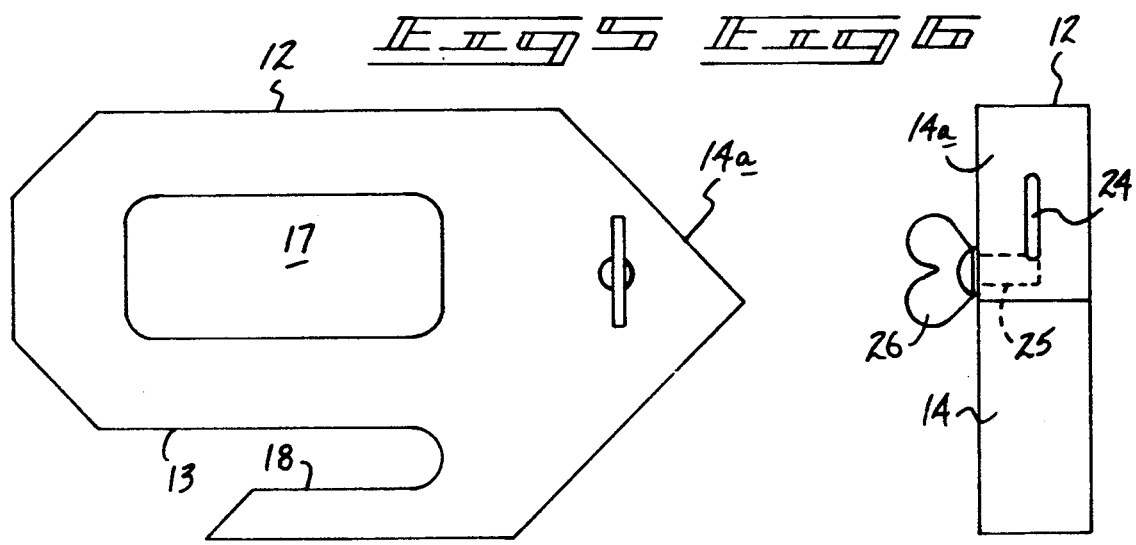

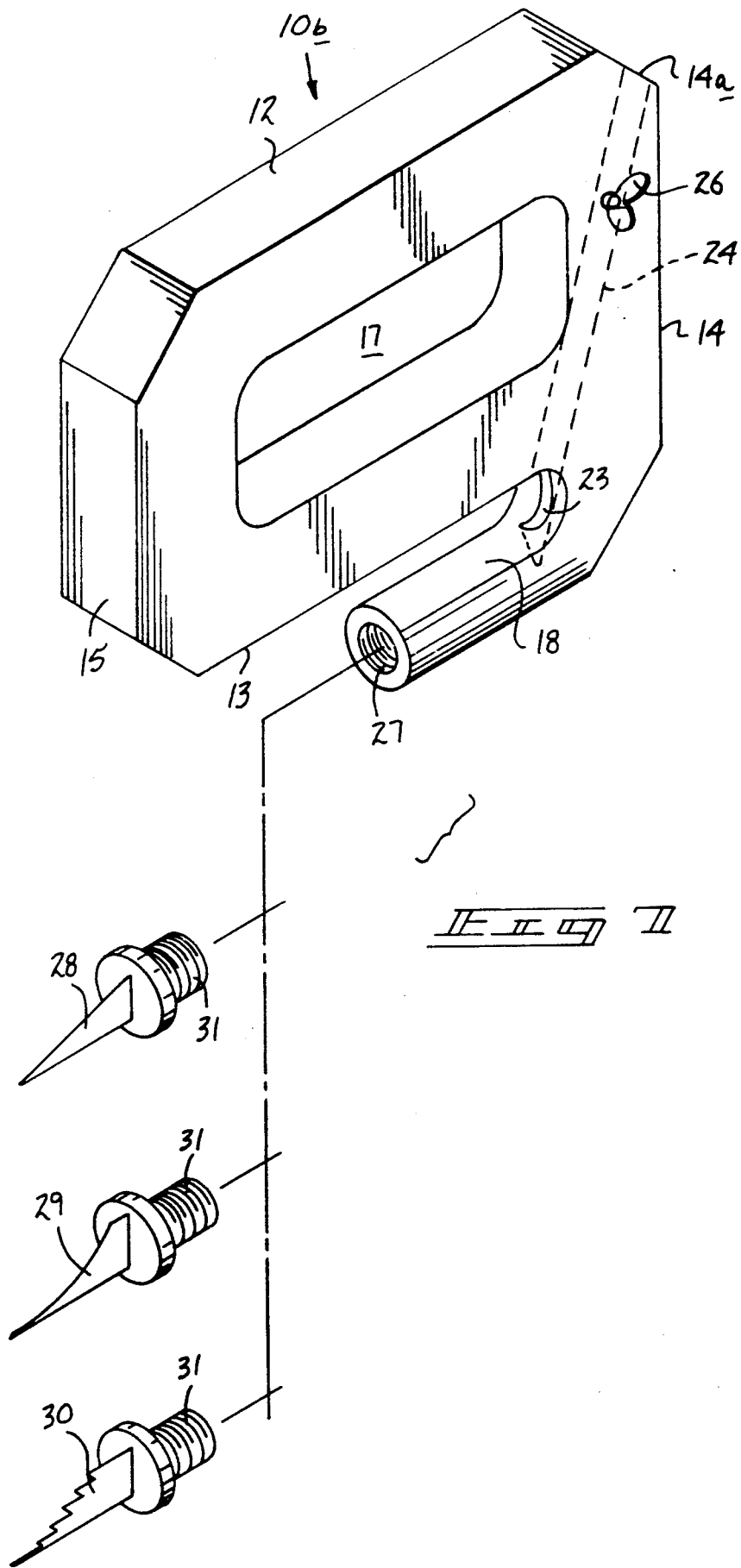

GAME CUTTING TOOL

BACKGROUND OF THE INVENTION

1. Field of the Invention

The field of invention relates to game cutting apparatus, and more particularly pertains to a new and improved game cutting tool wherein the same is arranged for the severing of an animal carcass prior to a cleaning procedure.

2. Description of the Prior Art

As utilized in typical hunting situations, a cutting organization is required to effect field dressing of an associated animal. Typically, a steady hand is required utilizing a single blade to prevent inadvertent and accidental injury to a user of the knife blade. The instant invention attempts to overcome deficiencies of the prior art by providing a unitary cutting organization wherein the same provides ease of directing of the structure about an animal carcass to initiate a game dressing procedure.

Accordingly, it may be appreciated that there continues to be a need for a new and improved game cutting tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of game cutting apparatus now present in the prior art, the present invention provides a game cutting tool wherein the same is formed with a unitary housing to effect ease of directing of an associated cutting blade structure directed across a game carcass. As such, the general purpose of the present invention, which will be described subsequently in greater detail, is to provide a new and improved game cutting tool which has all the advantages of the prior art game cutting apparatus and none of the disadvantages.

To attain this, the present invention provides a hand-held cutting tool including a unitary housing defining a through-extending opening for manual grasping of the housing, with a piercing boss plate mounted below a bottom wall of the housing to effect a piercing of an associated animal game carcass, with a cutting blade positioned at an obtuse angle between a cutting blade edge and the piercing boss plate to bend a forwardmost end portion of a cutting slot defined between the piercing boss plate and the housing bottom wall. A modification of the invention includes a blade receiving slot projecting through a rear wall of the housing and the cutting slot to permit reciprocation of the knife blade to effect a severing or sawing action of the game carcass as required.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved game cutting tool which has all the advantages of the prior art game cutting apparatus and none of the disadvantages.

It is another object of the present invention to provide a new and improved game cutting tool which may be easily and efficiently manufactured and marketed.

It is a further object of the present invention to provide a new and improved game cutting tool which is of a durable and reliable construction.

An even further object of the present invention is to provide a new and improved game cutting tool which is susceptible of a low cost of manufacture with regard to both materials and labor, and which accordingly is then susceptible of low prices of sale to the consuming public, thereby making such game cutting tools economically available to the buying public.

Still yet another object of the present invention is to provide a new and improved game cutting tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic end view of the instant invention.

FIG. 3 is an orthographic side view of the instant invention.

FIG. 4 is an isometric view of a modified cutting tool 10a.

FIG. 5 is an orthographic side view of the tool 10a.

FIG. 6 is an orthographic rear end view of the tool 10a.

FIG. 7 is an isometric illustration of a further modified tool apparatus utilized by the instant invention.

DESCRIPTION OF THE PREFERRED EMBODIMENT

With reference now to the drawings, and in particular to FIGS. 1 to 7 thereof, a new and improved game cutting tool embodying the principles and concepts of the present invention and generally designated by the reference numerals 10, 10a, and 10b will be described.

More specifically, the game cutting tool 10 of the instant invention essentially comprises a central unitary housing 11, including a top wall 12, spaced from and parallel a bottom wall 13, wherein the top and bottom walls are each of a predetermined first length. A rear wall 14 is spaced from a front wall 15. The opening 17 orthogonally directed through the parallel side walls 16 of the housing 11 permits manual grasping of the unitary housing 11 in use. A piercing boss plate 18 arranged parallel to the bottom wall 13 and positioned therebelow is defined by a predetermined second length less than the first length terminating in a forward pointed tip 19 defining a cutting slot 32 (see FIG. 3), with a cutting blade 20 mounted within the forward terminal end of the cutting slot adjacent the rear wall 14. The cutting blade includes a cutting edge 20a that defines an obtuse included angle 21 between the cutting edge 20a and the piercing boss plate 18.

In use, the cutting slot 32 receives an animal skin therewithin subsequent to piercing of the animal skin by the pointed tip 19, and in an opening of the skin and hide prior to a dressing procedure, the individual grasps the unitary housing 11 through the housing opening 17 and thereafter directs the cutting blade or knife member 22 along the skin for a cutting procedure.

The tool 10a, as illustrated in FIGS. 4-6, includes a knife member blade 22 that is received within a blade slot 23 that is directed from an entrance opening through an upper rear wall 14a into the boss plate 18. The upper rear wall 14a defines an obtuse included angle between the upper rear wall and the top wall 12. Upon directing of the knife blade 22 into the slot 24, the blade 22 projects through a blade slot 23 to provide proper orientation of the knife blade at the aforenoted obtuse included angle between the knife blade 22 and the boss plate 18. The knife blade 22 may thereafter be slidably mounted within the slot 24 to permit a sawing action to enhance ease of projection of the knife through a carcass, or alternatively may be fixedly fastened by use of a clamp rod 25 that orthogonally intersects the knife receiving slot 24, wherein a projecting rod head 26 effects a clamping of the clamp rod 25 against the associated knife member blade 22. Further in this manner, a handle portion of the knife blade 22 is utilized in cooperation with the housing opening 17 to provide a two-handed control of the organization in use.

The organization 10b, as illustrated in FIG. 7, further includes a modified piercing boss plate 18 that includes an internally threaded bore 27 oriented parallel relative to the bottom wall 13, and includes a replaceable cutting tip to include a respective first, second, and third cutting tip 28, 29, and 30 respectively to define various cutting shapes, as well as a saw blade shape in the third cutting tip 31. Each cutting tip 28 is mounted to a threaded boss 31 to threadedly receive the threaded boss with the internally threaded bore 27 to provide replaceable cutting tips in the piercing of an animal hide prior to the dressing procedure in a hunting environment.

As to the manner of usage and operation of the instant invention, the same should be apparent from the above disclosure, and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game cutting tool, comprising, a unitary housing, the unitary housing including a top wall spaced from and parallel a bottom wall, and a rear wall spaced from a front wall, and the housing further including spaced parallel side walls, and a housing opening orthogonally directed through the side walls to provide a manual grasping opening for securement of the unitary housing, and a piercing boss plate positioned below the bottom wall, and the bottom wall defined by a predetermined first length, with the piercing boss plate defined by a predetermined second length less than the first length, and the piercing boss plate including a forward pointed tip, with the piercing boss plate arranged in a parallel relationship below the bottom wall, with a cutting slot positioned between the bottom wall and the piercing boss plate, and a cutting blade mounted within a forward terminal end of the cutting slot adjacent the rear wall, and the cutting blade includes a cutting edge, the cutting edge inclined at an obtuse included angle between the cutting edge and the boss plate, and a knife member blade, the knife member blade including a handle mounted at an upper terminal end thereof, and the unitary housing further including an upper rear wall, the upper rear wall positioned above the rear wall defining an obtuse included further angle between the top wall and the upper rear wall, and a neck member blade slot projecting through the unitary housing extending from the upper rear wall into the boss plate, and the neck member blade projecting into the cutting slot defining the cutting blade and the cutting edge within the cutting slot,
and
the knife member blade slot includes a projecting clamp rod orthogonally intersecting the knife member blade slot, the clap rod including a projecting rod head positioned exteriorly of one of said side walls to permit manual rotation and projecting of the clamp rod into the knife member blade slot,
and
the boss plate includes a threaded bore oriented parallel relative to the bottom wall, and the pointed tip including a threaded boss threadedly receivable within the internally threaded bore.

* * * * *